US009167178B2

(12) United States Patent
Paulsen

(10) Patent No.: US 9,167,178 B2
(45) Date of Patent: Oct. 20, 2015

(54) METHOD FOR CONTROLLING A DEVICE FOR DISTRIBUTION OF SIGNALS

(75) Inventor: Arnd Paulsen, Darmstadt (DE)

(73) Assignee: GVBB Holdings S.A.R.L., Luxembourg (LU)

(*) Notice: Subject to any disclaimer, the term of this patent is extended or adjusted under 35 U.S.C. 154(b) by 1663 days.

(21) Appl. No.: 11/473,279

(22) Filed: Jun. 21, 2006

(65) Prior Publication Data

US 2007/0073906 A1 Mar. 29, 2007

(30) Foreign Application Priority Data

Jun. 24, 2005 (DE) .......................... 10 2005 029 737

(51) Int. Cl.
| H04B 3/00 | (2006.01) |
| H02B 1/00 | (2006.01) |
| H04L 12/50 | (2006.01) |
| H04Q 11/00 | (2006.01) |
| H04N 5/268 | (2006.01) |
| H04Q 3/00 | (2006.01) |
| H04N 21/436 | (2011.01) |

(52) U.S. Cl.
CPC ......... *H04N 5/268* (2013.01); *H04N 21/43615* (2013.01); *H04Q 3/00* (2013.01); *H04Q 3/0012* (2013.01)

(58) Field of Classification Search
None
See application file for complete search history.

(56) References Cited

U.S. PATENT DOCUMENTS

| 4,057,711 | A | * | 11/1977 | Asthana et al. .................... 708/1 |
| 4,075,608 | A | * | 2/1978 | Koenig ........................ 340/2.27 |
| 4,577,308 | A | * | 3/1986 | Larson et al. .................. 370/212 |
| 5,790,177 | A | * | 8/1998 | Kassatly .......................... 725/87 |
| 6,519,540 | B1 |  | 2/2003 | Salandro |
| 6,870,936 | B1 | * | 3/2005 | Ajamian ....................... 381/119 |
| 2001/0024240 | A1 | * | 9/2001 | Fujita et al. ................... 348/705 |
| 2007/0171935 | A1 |  | 7/2007 | Paulsen |

FOREIGN PATENT DOCUMENTS

| DE | 3881172 | 12/1993 |
| DE | 103 14 105 A1 | 1/2004 |
| DE | 102004009265 A1 | 9/2005 |
| EP | 1 065 816 A1 | 1/2001 |

OTHER PUBLICATIONS

Author Unknown, The CM 4000 Installation and Operating Manual, Thompson Broadcast Systems, Aug. 14, 2003, pp. 1-167.*

(Continued)

*Primary Examiner* — Christopher Crutchfield
(74) *Attorney, Agent, or Firm* — Arent Fox LLP

(57) ABSTRACT

A method is proposed for controlling a device for distribution of audio, video, data and control signals. The device has a number of inputs and outputs, which can be connected by the switching of takes, and which cover signal paths. Tally signaling signals inputs or outputs as being transmission-relevant. The method comprises the following steps: successful switching operations of takes are locked against further switching operations automatically and without any intervention by an operator. Signal paths are completely locked or unlocked on the basis of tally signaling of an input or output by automatic locking or unlocking of the takes involved. Signal paths are combined to form signal bundles. When signal bundles are locked or unlocked on the basis of tally signaling of the bundle, all of the signal paths involved are automatically locked or unlocked.

57 Claims, 3 Drawing Sheets

(56) References Cited

OTHER PUBLICATIONS

Author Unknown, Panasonic Matrix Switcher Operating Instructions, Model No. WJ-SX150A, 2003, pp. 1-176.*

Riesener: "Digitale HD/SDI-Kreuzschiene in kompakter Bauform" Fernseh-Und Kino-Technik, vol. 56, No. 8-9, 2002, pp. 494-496.

Paulsen: "Signal-Management im Hauptschaltraum" Fernseh-Und Kino-Technik, vol. 56, No. 12, 2002, pp. 699-702.

Delnef: "Kreuzschienensteuerung: Heutige Systeme und künftige Entwicklungen" Fernseh-und Kino-Technik, 56. Jg., Nr.10, 2002, pp. 584-589.

German Search Report—Application No. 102005029737.41—Mar. 21, 2006.

German Office Action dated Apr. 22, 2014 (received in our office on Dec. 22, 2014) regarding DE102006022200.8, and English translation of Office Action.

German Office Action dated Nov. 11, 2014, regarding DE102005029737.4, and English translation of Office Action.

* cited by examiner

METHOD FOR CONTROLLING A DEVICE FOR DISTRIBUTION OF SIGNALS

This application claims the benefit, under 35 U.S.C. §119 of German Patent Application 10 2005 029 737.4 filed June 24, 2005.

FIELD OF THE INVENTION

The invention relates to a method for controlling a device for distribution of audio, video, data and control signals. In particular, the invention relates to a device according to claim 1.

BACKGROUND OF THE INVENTION

Numerous audio, video, data and control signal sources and sinks are available in television studios. These various types of signal sources include recording appliances, such as tape recorders (MAZ), video servers, cameras and satellite or cable links. The various types of signal sinks once again include recorders, video servers, production mixers. By way of example, different image and audio signal sources are combined with one another to form a program in the production of a news program. A speaker in the studio typically provides the lead through the transmission, which is recorded using one or more cameras. The speaker introduces already recorded programs or direct transmissions. In terms of video, audio and data, these come from a source which is controlled via control signals.

Various signal sources can be connected to their destination by means of switching matrices and mixers. This switching matrix, a so-called crossbar, is a matrix which has a fixed defined number of inputs and a fixed defined number of outputs. Each input can be connected to one specific output which, in detail, means that one input can be connected to a plurality of outputs, but one output can be connected to only one input. A production mixer or presentation schedule mixer, has the same characteristics as a switching matrix, that is able to combine a plurality of signal sources to form one transmission signal. Mixing of different video signals with one another, as well as mixing of different audio signals with one another, are desirable from the composition point of view. For further signal distribution, a presentation schedule mixer is also able to combine audio and video signals into one data stream. Mixing devices use control lines to signal which input signals are passed on and are thus transmission-relevant. Recorders signal that recording is taking place. This signal is known by the expressions "On-Air", "Red-Light" or tally signaling.

The selection of which signals are produced at which outputs is carried out by an operator in the studio or control room. Connections are generally switched via a plurality of switching matrices and mixing devices, and cover so-called paths. The search for paths, which is assisted by automatic systems, is normally referred to as "pathfinding". The task of the operator is also made more difficult by paths for different signal types being switched at the same time in the course of production, thus forming a logical unit, a so-called signal bundle. In order to prevent interference with a signal transmission, it is essential to prevent interruption of signal paths and path bundles. The locking of a path, which is assisted by automatic systems, is normally referred to as "path locking", while the locking of a plurality of paths assisted by automatic systems is referred to as "bundle locking".

DE 10 2004 009 265.6 discloses a method by means of which the operator can lock or unlock signal paths or signal bundles in the forward or backward direction by means of an appropriate command. By way of example, this prevents a transmission-relevant signal path from being accidentally interrupted. Since locked resources are normally associated with one user, the attempt to unlock an external resource will fail.

In summary, it can be stated that the activity of the operator also has technical aspects, in addition to the creative aspect of mixing and configuring television pictures from different signal sources. On the one hand, the correct signal sources must be selected for the input side, and must be passed to the correct outputs. Even this is quite difficult when there are more than two hundred inputs and two hundred outputs per switching matrix. On the other hand, the locking and unlocking of the input to output connections must be taken into account at the same time in this case, since a plurality of operators work in one studio or control room. For these reasons, the work of the operators in terms of the use of resources which are or are not jointly used is highly demanding.

There is thus a requirement to provide a method which reduces the load on the operator during his work, and as far as possible takes the stated technical aspects away from him, in order that he can concentrate on the creative aspect of his work.

SUMMARY OF THE INVENTION

The method according to the invention is used for controlling a device for distribution of audio, video, data and control signals. The device (switching matrix) has a number of inputs and outputs. Connections in these switching matrices, so-called takes, can be locked. The method according to the invention comprises the following steps:
   (a) selection of takes which are required for a signal path between an input and an output;
   (b) switching of takes selected in step (a) in order to produce the signal path; and
   (c) automatic locking of the takes in the state selected in step (b).

The invention makes it simpler for an operator to control a device for distribution of audio, video, data and control signals with respect to the switching matrix, path and bundle locking as well as unlocking, because the method carries out a large number of functions automatically at machine level. The expression "TakeLock" will be introduced for the function of automatic locking after switching, and the expression "TallyLock" will be introduced for the function of signaled path locking. "Signalling" is also used, for short, in the following text for tally signaling.

In one embodiment of the invention, the takes are successively locked in the signal flow direction, starting from a signal source. All of the signal sources and/or signal sinks which are included in the signal path produced in step b) are indicated by optical means.

In an entirely corresponding manner, it is possible to provide for the takes to be locked in the opposite direction to the signal flow direction starting from a signal sink, and for all of the signal sources and/or signal sinks which are included in the signal path produced in step b) to be indicated by optical means.

In one refinement of the invention, a method is described which describes take locking functions which are subject to the condition of take changing and/or the condition of signaling.

In one development of the invention, this method is extended to the signaled locking of path bundles.

These features give the invention the advantage that control errors by a competing operator are virtually precluded, thus protecting the work of the operator involved.

BRIEF DESCRIPTION OF THE DRAWINGS

The major aspects of the method according to the invention are illustrated in the drawing, in which.

DETAILED DESCRIPTION OF AN EMBODIMENT OF THE INVENTION

Figure 1:
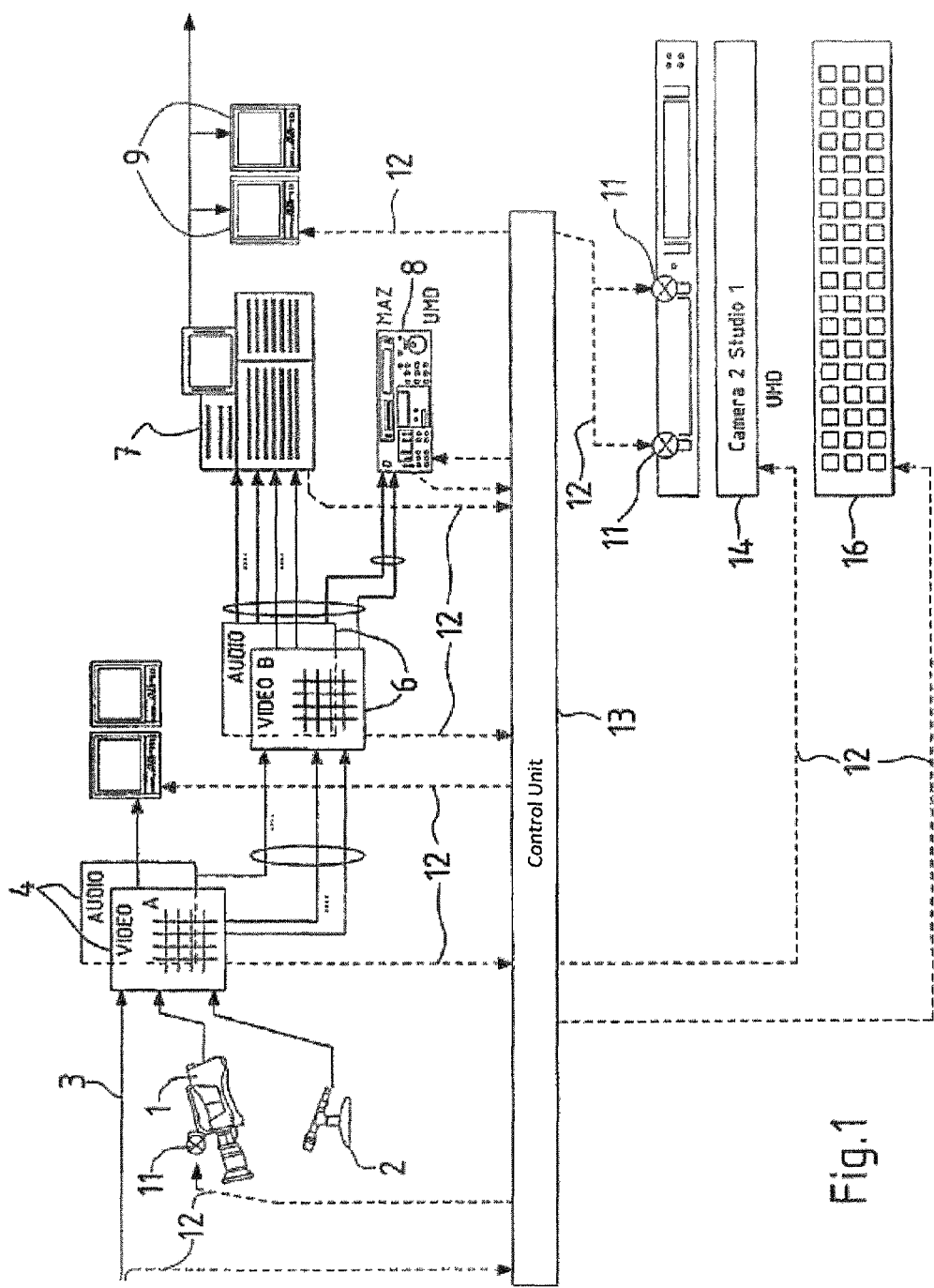
FIG. 1: shows a schematic block diagram of a production with signal paths and the creation of a path bundle from all the signal paths involved in the production, as well as the tally signaling and tally indications.

FIG. 1 shows a schematic block diagram of a production from a live correspondent transmission and an external feed. The illustrated components form one example of a device for distribution of audio, video, data and control signals, for which the method according to the invention can be used. Various signal sources are illustrated on the left-hand side of FIG. 1. These in each case include a video and audio source from correspondents from a studio, in the form of a camera 1 and a microphone 2, as well as an external video line 3. These sources are passed to the production control room via switching matrices 4. Switching matrices are connected in series via fixed defined links, so-called tie lines, and are connected from there to mixing devices via fixed defined connecting lines. In the production control room, there are further switching matrices 6, a mixing device 7 and a reorder 8, which act as signal sinks. Furthermore, monitors 9 are provided, which act as further signal sinks and to which the output signal from the mixing device 7 is supplied. All of the signal sinks have a tally display 11, which is also referred to as a red-light display. As a signal source, the camera 1 likewise has a tally display 11. The signal sources and signal sinks illustrated in FIG. 1 are connected via separate control lines 12 to a higher-level control device 13, in order to carry out the tally signaling.

The production block diagram will be described only cursorily, because the individual components of the production facility are known from the prior art. The schematically illustrated functional blocks are commercially available, for example from Thomson. Switching matrices or cross bars are marketed by Thomson under the product names "Trinix" and "Apex". Tape recorders or video servers are offered in the "DCR" and "Profile" product ranges from Thomson. The numerous switching matrices in the entire facility are linked to the higher-level control unit 13 via command lines, with the control unit 13 being shown in the centre of FIG. 1. The control unit is equipped with display devices, so-called UMDs 14 ("Under-Monitor-Displays"), on which the current status of the facility, in detail the selected source name, is displayed. Furthermore, the control unit has control devices, so-called control panels 16 (CPs), by means of which the switching matrix status can be changed with regard to the "Takes" and their "Locks".

The control device 16 is also used as a display device for switching operations and locking state that have been carried out, in order to assist the operator during configuration changes throughout the entire production facility, in that individual method steps of the control method according to the invention are displayed. Some of the major method steps will be explained in more detail in the following text with reference to FIGS. 2 and 3.

Figure 2:
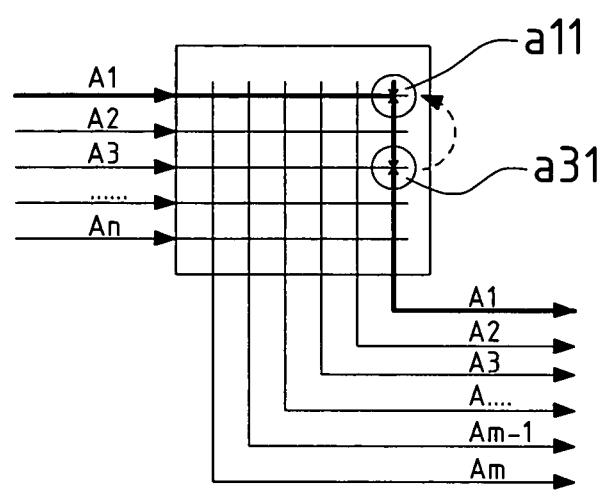
FIG. 2: shows the detailed illustration of take switching with direct locking in a switching matrix.

Takes and signal paths are locked or unlocked using the method according to the invention. FIG. 2 shows an example of a take connection in the form of a bold line, on the basis of which the following method (a) will be explained. A signal is first of all supplied to the switching matrix A at the input A3 and connected to the output A1 by switching the take $a_{31}$. It is assumed that the take $a_{31}$ is not locked, or has previously been explicitly unlocked. The take $a_{31}$ is then disconnected in the "TakeLock" mode, and the take $a_{11}$ is switched. The special feature of the method is that, when a successful switching operation takes place, that is to say when the switching state of a take within a switching matrix is changed, this newly set take is locked automatically, without any action by an operator. The successful "TakeLock" for the take $a_{11}$ switches and locks the take $a_{11}$.

The signal path is connected between an input and an output within a switching matrix by operation of the linking function of a switching matrix. A connection is locked in the switching matrix by operation of the take locking function in the switching matrix. A complete signal path or a plurality of switching matrices is connected by operation of the path linking function "path finding" of a higher-level instance. In the present exemplary embodiment, the higher-level instance is the control unit 13. A complete signal path through a plurality of switching matrices is locked by operation of the path locking function "path locking" in a higher-level instance.

The set of takes for which this automatic system is used is a subset of all the takes of the switching matrix. This subset can be defined by configuration of the automatic system.

Figure 3:
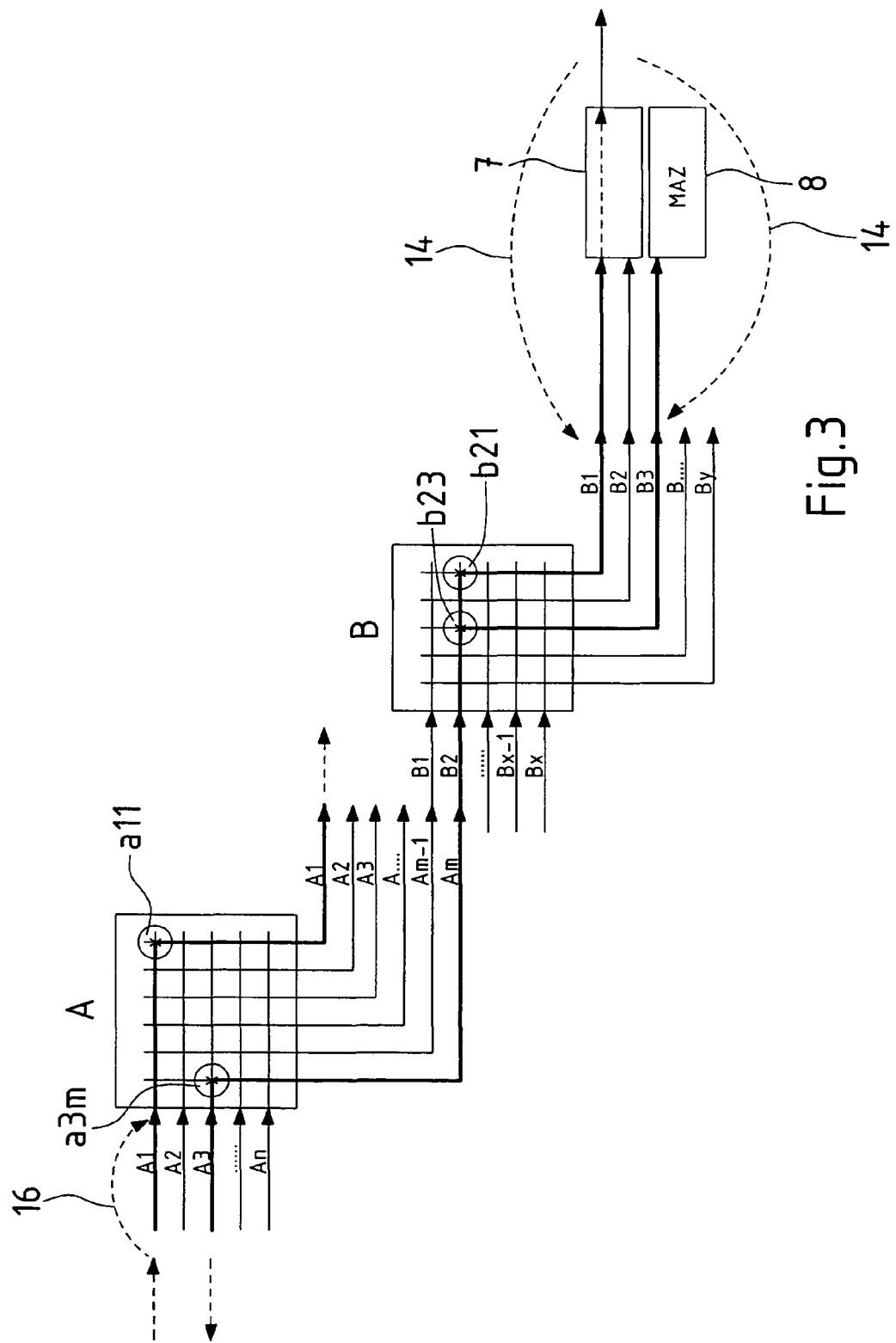
FIG. 3: shows the detailed illustration of a split signal path through a plurality of switching matrices, as well as the points in the tally signaling and tally indication.

FIG. 3 shows an example of a take connection in the form of a bold line, with reference to which the following method (b) will be explained. A signal is first of all supplied to the switching matrix A at the input A3, and is supplied to the switching matrix B via the input B2 by switching the take $a_{3m}$ via the output Am. In the switching matrix B, the signal is supplied to the output B1, and thus to the mixing device 7, by switching a take $b_{21}$. In addition, the signal at the input B2 is supplied via the output B3 to the recorder 8 by switching the tape $b_{23}$. The mixing device 7 and the recorder 8 signal the relevant output in the case of transmission-relevance, that is to say in the case where the signal is used ("backward tally"). When signaling is activated, all of the tally displays 11 (UMDs, camera red-light) are activated for sources which are used for the output signal. The tally signal takes place in the opposite direction to the signal flow direction, and is indicated by dashed arrows 14 in FIG. 3.

When the signaling of an output of a switching matrix is activated, locking of the signal path starting from the signaled output in the opposite direction to the signal flow direction is initiated automatically and without any action by an operator. In this case, only takes which have been unlocked prior to this are locked. The activated signaling of the output B1 locks the path in the backward direction starting from the output B1, and thus the following takes $b_{21}$, $a_{3m}$. The activation of the signaling and the output B3 locks the path in the backward direction, starting from the output B3 and thus only the following take: $b_{23}$.

When the signaling of an output of a switching matrix is deactivated, unlocking of the signaled path is initiated starting from the signaled output in the opposite direction to the signal flow direction automatically and without any action by an operator. The deactivation of the signaling at the output B1 removes the locks in the path in the backward direction starting from the output B1. In consequence, the locks on the takes $b_{21}$ and $a_{3M}$ are cancelled.

In this case, the only takes which are unlocked are those which do not cancel the locking of locked paths that are also being used. When the signal path is unlocked in the backward direction starting from the output B1, the deactivation of the signaling at the output B3 thus removes only the locking of the take $b_{23}$, because the take $a_{3m}$ is also relevant for the active output B1.

FIG. 3 shows a further example of a take link, in the form of a bold line, with reference to which the following method (c) will be explained. A signal is supplied to the switching matrix A at the input A1, and is connected to the output A1 by switching the take $a_{11}$. Transmission devices which are connected upstream of the input can signal the relevant input ("forward tally"). When signaling is activated, all of the tally displays (UMDs) of the sinks (for example monitor walls) being used are activated. The tally signaling takes place in the signal flow direction, and is indicated by the dashed arrow 16 in FIG. 3.

When signaling of an input of a switching matrix is activated, locking of the signal path is initiated automatically and immediately, starting from the signaled input in the signal flow direction. The activated signaling at the input A1 locks the path in the forward direction, starting from the input A1, and thus locks the take $a_{11}$.

Conversely, when the signaling of an input of a switching matrix is deactivated, unlocking of the signal path is initiated automatically, starting from the signaled input in the signal flow direction. The deactivation of the signaling at the input A1 removes its own locks on the path in the forward direction starting from the input A1, and thus the locking of the take $a_{11}$.

One particular advantage of the method according to the invention is that the operator largely has monitoring and control tasks at the machine level removed from him, and can concentrate on the creative aspect of his work.

In one development of the invention, the stated advantage is further assisted in that signaling devices which use a plurality of signals can signal them at the same time. For example, audio/video mixers or audio/video recording devices in this case signal an audio/video signal bundle comprising a plurality of paths as being transmission-relevant. In this case, the tally displays are activated for all of the sources involved in the signal bundle (backward tally), or the tally displays are activated for all of the sinks involved in the signal bundle (forward tally). Locking of paths of a signal bundle on the basis of the tally signaling is possible by successive or parallel application of method (b) to each path involved in the bundle.

In developments of the invention, warning instruction for the operator are also displayed visually and/or audibly.

The method according to the invention can also be in the form of a software programme which can run on a production facility as described above.

What is claimed is:

1. A method for controlling a device for distribution of audio, video, data, or control signals, with the device having at least one switching matrix, which has a number of inputs and a number of outputs, as well as a corresponding number of takes for production of links between the inputs and outputs, the method comprising:
    selecting takes which are required for a signal path between an input and an output;
    switching the selected takes to a state in order to produce the signal path; and
    automatically locking the switched takes in the state at a machine level, the automatic locking occurring when signaling of an input or output of the at least one switching matrix is activated, wherein the activation comprises transmission of a signal through the switching matrix using the input or output.

2. The method according to claim 1, wherein the takes are successively locked in a signal flow direction starting from a signal source and all of the signal sources and/or signal sinks which are included in the produced signal path are indicated by optical means.

3. The method according to claim 1, wherein the takes are locked in an opposite direction to the signal flow direction starting from a signal sink and all of the signal sources and/or signal sinks which are included in the produced signal path are indicated by optical means.

4. The method according to claim 1, wherein the takes are unlocked in a signal flow direction.

5. The method according to claim 1, characterized in that wherein the takes are unlocked successively in an opposite direction to a signal flow direction.

6. The method according to claim 1, wherein a plurality of signal paths are combined to form a signal bundle, and are jointly locked.

7. The method according to claim 6, wherein the combination of a the plurality of signal paths to form a path bundle is carried out by entry of inputs or outputs of respective signal paths in a list.

8. The method according to claim 7, wherein locking of the path bundle is carried out by locking the path bundle and by locking all of the plurality of signal paths which are combined to form the path bundle.

9. The method according to claim 7, wherein the path bundle is erased by deletion of all of the inputs and the outputs from the list.

10. The method according to claim 6, wherein the locked signal paths which are combined to form a locked path bundle cannot be unlocked.

11. The method according to claim 6, wherein the signal bundle is a subset of a plurality of takes of the switching matrix, and wherein the subset is defined by a configuration of the device.

12. The method according to claim 1, wherein the automatic locking occurs when a successful switching operation occurs.

13. The method according to claim 1, further comprising:
    receiving a user input to unlock a previously automatically locked take, while the take remains in use.

14. The method according to claim 1, wherein the set of takes for which the automatic locking occurs is a subset of the corresponding number of takes of the switching matrix, and wherein the takes of the switching matrix that are not within the subset are not automatically locked when switching of the takes occurs.

15. The method according to claim 14, wherein the subset is defined by a configuration of the device.

16. The method according to claim 1, further comprising: providing a warning instruction to an operator.

17. The method according to claim 1, wherein the signaling comprises a backward tally.

18. The method according to claim 1, wherein the signaling comprises a forward tally indicating that signaling of an input is activated.

19. The method according to claim 1, wherein locking the take prevents the signal path of the take from being interrupted.

20. A non-transitory computer-readable medium comprising program code, which can be stored in the program memory of a data processing installation and causes a program to be run which carries out the method steps according to claim 1.

21. The non-transitory computer-readable medium according to claim 20, wherein the takes are successively locked in a signal flow direction starting from a signal source and all of the signal sources and/or signal sinks which are included in the produced signal path are indicated by optical means.

22. The non-transitory computer-readable medium according to claim 20, wherein the takes are locked in an opposite direction to the signal flow direction starting from a signal sink and all of the signal sources and/or signal sinks which are included in the produced signal path are indicated by optical means.

23. The non-transitory computer-readable medium according to claim 20, wherein the takes are unlocked in a signal flow direction.

24. The non-transitory computer-readable medium according to claim 20, wherein the takes are unlocked successively in an opposite direction to a signal flow direction.

25. The non-transitory computer-readable medium according to claim 20, wherein a plurality of signal paths are combined to form a signal bundle, and are jointly locked.

26. The non-transitory computer-readable medium according to claim 25, wherein the combination of the plurality of signal paths to form a path bundle is carried out by entry of inputs or outputs of respective signal paths in a list.

27. The non-transitory computer-readable medium according to claim 26, wherein locking of the path bundle is carried out by locking the path bundle and by locking all of the plurality of signal paths which are combined to form the path bundle.

28. The non-transitory computer-readable medium according to claim 26, wherein the path bundle is erased by deletion of all of the inputs and the outputs from the list.

29. The non-transitory computer-readable medium according to claim 25, wherein the locked signal paths which are combined to form a locked path bundle cannot be unlocked.

30. The non-transitory computer-readable medium according to claim 25, wherein the signal bundle is a subset of a plurality of takes of the switching matrix, and wherein the subset is defined by a configuration of the device.

31. The non-transitory computer-readable medium according to claim 20, wherein the automatic locking occurs when a successful switching operation occurs.

32. The non-transitory computer-readable medium according to claim 20, further comprising program code for:
receiving a user input to unlock a previously automatically locked take, while the take remains in use.

33. The non-transitory computer-readable medium according to claim 20, wherein the set of takes for which the automatic locking occurs is a subset of the corresponding number of takes of the switching matrix, and wherein the takes of the switching matrix that are not within the subset are not automatically locked when switching of the takes occurs.

34. The non-transitory computer-readable medium according to claim 33, wherein the subset is defined by a configuration of the device.

35. The non-transitory computer-readable medium according to claim 20, further comprising program code for:
providing a warning instruction to an operator.

36. The non-transitory computer-readable medium according to claim 20, wherein the signaling comprises a backward tally.

37. The non-transitory computer-readable medium according to claim 20, wherein the signaling comprises a forward tally indicating that signaling of an input is activated.

38. The non-transitory computer-readable medium according to claim 20, wherein locking the take prevents the signal path of the take from being interrupted.

39. A device for distribution of audio, video, data, or control signals, the device comprising:
at least one switching matrix, which has a number of inputs and a number of outputs, as well as a corresponding number of takes for production of links between the inputs and outputs,
wherein when takes which are required for a signal path between an input and an output are selected and the selected takes are switched to a state in order to produce the signal path, the device is configured to automatically lock the switched takes in the state at a machine level, the automatic locking occurring when signaling of an input or output of the at least one switching matrix is activated,
wherein the activation comprises transmission of a signal through the switching matrix using the input or output.

40. The device according to claim 39, wherein the device is configured to successively lock the takes in a signal flow direction starting from a signal source and all of the signal sources and/or signal sinks which are included in the produced signal path are indicated by optical means.

41. The device according to claim 39, wherein the device is configured to lock the takes in an opposite direction to the signal flow direction starting from a signal sink and all of the signal sources and/or signal sinks which are included in the produced signal path are indicated by optical means.

42. The device method according to claim 39, wherein the device is configured to unlock the takes in a signal flow direction.

43. The device according to claim 39, wherein the device is configured to successively unlock the takes in an opposite direction to a signal flow direction.

44. The device according to claim 39, wherein the device is configured to form a single bundle of a plurality of signal paths and to jointly lock the single bundle.

45. The device according to claim 44, wherein the device is configured to carry out the combination of the plurality of signal paths to form a path bundle by entry of inputs or outputs of respective signal paths in a list.

46. The device according to claim 45, wherein the device is configured to lock the path bundle by locking the path bundle and by locking all of the plurality of signal paths which are combined to form the path bundle.

47. The device according to claim 45, wherein the device is configured to erase the path bundle by deletion of all of the inputs and the outputs from the list.

48. The device according to claim 44, wherein the device is configured to lock signal paths which are combined to form a locked path bundle that cannot be unlocked.

49. The device according to claim 44, wherein the path bundle is a subset of a plurality of takes of the switching matrix, and wherein the subset is defined by a configuration of the device.

50. The device according to claim 39, wherein the device is configured to automatically lock the take when a successful switching operation occurs.

51. The device according to claim 39, wherein the device is configured to unlock a previously automatically locked take, while the take remains in use, in response to a user input.

52. The device according to claim 39, wherein the set of takes for which the automatic locking occurs is a subset of the corresponding number of takes of the switching matrix, and wherein the takes of the switching matrix that are not within the subset are not automatically locked when switching of the takes occurs.

53. The device according to claim 52, wherein the subset is defined by a configuration of the device.

54. The device according to claim 39, wherein the device is further configured to provide a warning instruction to an operator.

55. The device according to claim 39, wherein the signaling comprises a backward tally.

56. The device according to claim 39, wherein the signaling comprises a forward tally indicating that signaling of an input is activated.

57. The device according to claim 39, wherein locking the take prevents the signal path of the take from being interrupted.

* * * * *